United States Patent
Inoue et al.

(10) Patent No.: US 11,003,927 B2
(45) Date of Patent: May 11, 2021

(54) TARGET RECOGNITION APPARATUS, TARGET RECOGNITION METHOD, AND VEHICLE CONTROL SYSTEM

(71) Applicants: DENSO CORPORATION, Kariya (JP); TOYOTA JIDOSHA KABUSHIKI KAISHA, Toyota (JP)

(72) Inventors: Tomohiko Inoue, Kariya (JP); Tadashi Sakai, Kariya (JP); Yohei Masui, Kariya (JP); Takashi Maeda, Nagoya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 16/124,668

(22) Filed: Sep. 7, 2018

(65) Prior Publication Data
US 2019/0080187 A1    Mar. 14, 2019

(30) Foreign Application Priority Data
Sep. 14, 2017    (JP) .............................. JP2017-176854

(51) Int. Cl.
*G06K 9/00*    (2006.01)
*G06T 7/73*    (2017.01)
(Continued)

(52) U.S. Cl.
CPC ............ *G06K 9/00825* (2013.01); *G01S 7/41* (2013.01); *G01S 13/726* (2013.01); *G01S 13/867* (2013.01);
(Continued)

(58) Field of Classification Search
CPC ............ G06K 9/00825; G06K 9/6293; G06K 9/00805; G01S 13/726; G01S 13/867; G01S 13/931; G01S 7/41; G01S 2013/93271; G01S 2013/932; G01S 2013/9325; G01S 13/86; G06T 7/74; G06T 2207/20061; G06T 2207/30248; G06T 2207/30256; G06T 2207/20076
(Continued)

(56) References Cited

U.S. PATENT DOCUMENTS 9,778,352 B2 * 10/2017 Mizutani ............ G06K 9/00805
2009/0135065 A1 * 5/2009 Tsuchida ............... G01S 17/931
342/454

(Continued)

FOREIGN PATENT DOCUMENTS

JP    2005-121496 A    5/2005

*Primary Examiner* — Van D Huynh
(74) *Attorney, Agent, or Firm* — Maschoff Brennan

(57) ABSTRACT

In a target recognition apparatus that recognizes a target in a periphery of an own vehicle, a radar target acquiring unit acquires, as a radar target, the target that is detected by transmission and reception of radar waves. An image target acquiring unit acquires, as an image target, the target that is included in a captured image captured by an imaging apparatus. A target recognizing unit recognizes, as a first target, one of a plurality of radar targets included in a predetermined area relative to the image target and recognizes, as a second target, at least one of the plurality of radar targets other than the first target. A sameness determining unit determines whether the first target and the second target are the same object.

18 Claims, 9 Drawing Sheets

(51) Int. Cl.
*G01S 7/41* (2006.01)
*G01S 13/931* (2020.01)
*G01S 13/86* (2006.01)
*G01S 13/72* (2006.01)
*G06K 9/62* (2006.01)

(52) U.S. Cl.
CPC ........ *G01S 13/931* (2013.01); *G06K 9/00805* (2013.01); *G06K 9/6293* (2013.01); *G06T 7/74* (2017.01); *G01S 2013/932* (2020.01); *G01S 2013/9325* (2013.01); *G01S 2013/93271* (2020.01); *G06T 2207/20061* (2013.01); *G06T 2207/20076* (2013.01); *G06T 2207/30248* (2013.01); *G06T 2207/30256* (2013.01)

(58) Field of Classification Search
USPC ........................................................ 382/103
See application file for complete search history.

(56) References Cited

U.S. PATENT DOCUMENTS

| | | | | |
|---|---|---|---|---|
| 2014/0139369 A1* | 5/2014 | Baba | .................. | G01S 13/50 |
| | | | | 342/146 |
| 2015/0054673 A1* | 2/2015 | Baba | .................. | G01S 13/867 |
| | | | | 342/27 |
| 2015/0338516 A1* | 11/2015 | Kijima | ............... | G06K 9/00825 |
| | | | | 701/1 |
| 2016/0137157 A1* | 5/2016 | Sasabuchi | ............... | G06T 7/246 |
| | | | | 382/103 |
| 2019/0293758 A1* | 9/2019 | Masui | .................. | G01S 13/867 |

* cited by examiner

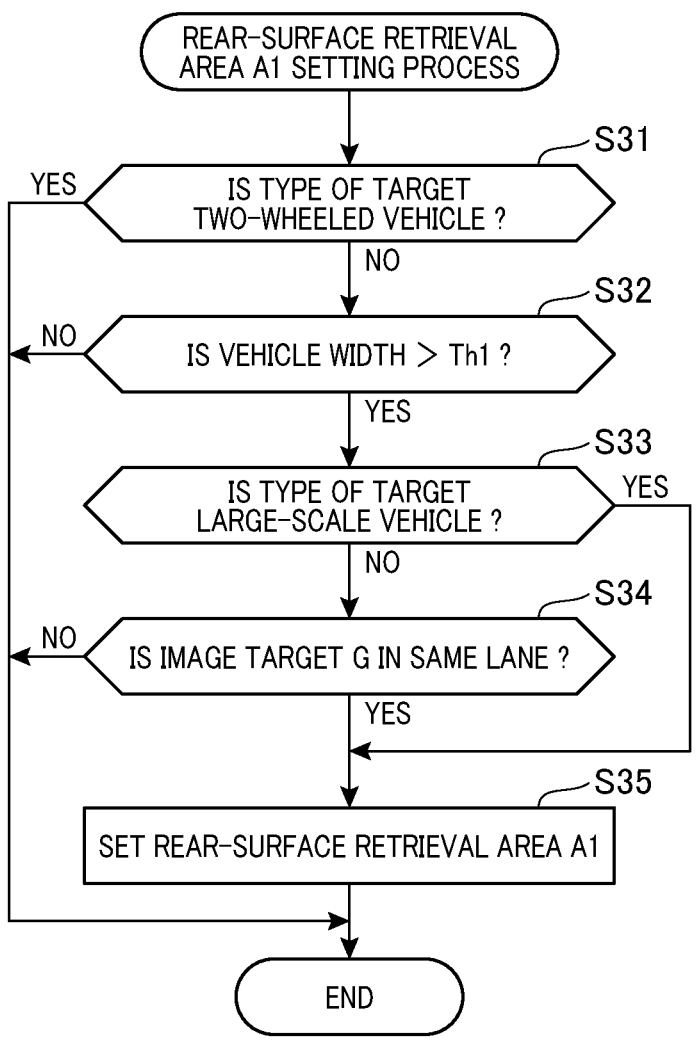

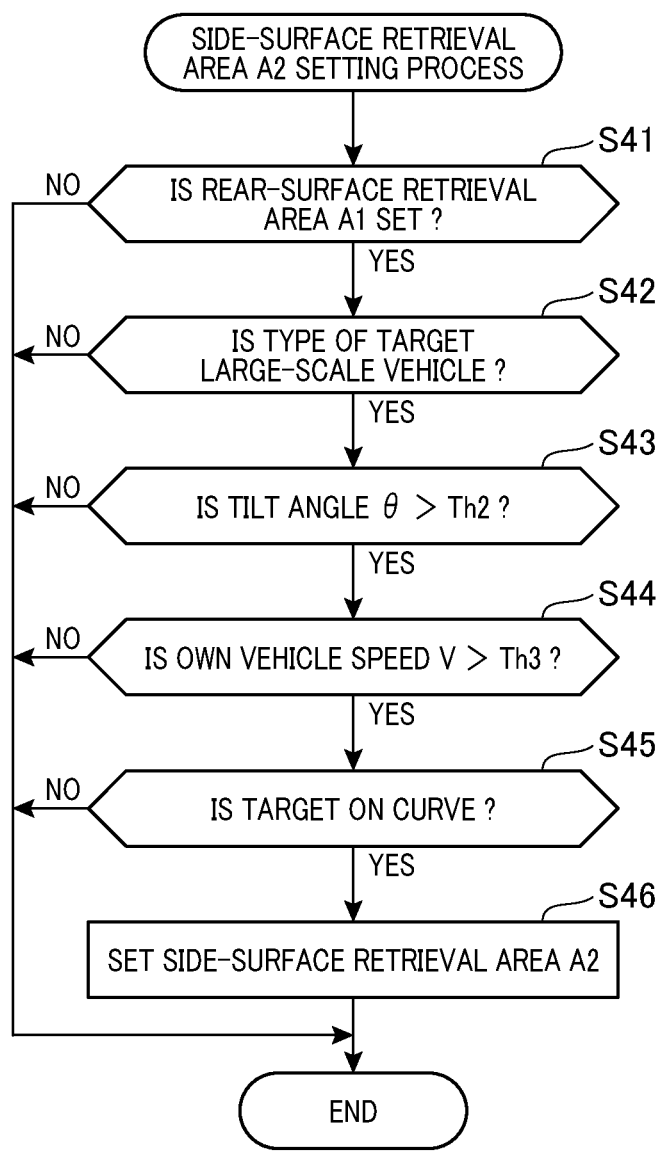

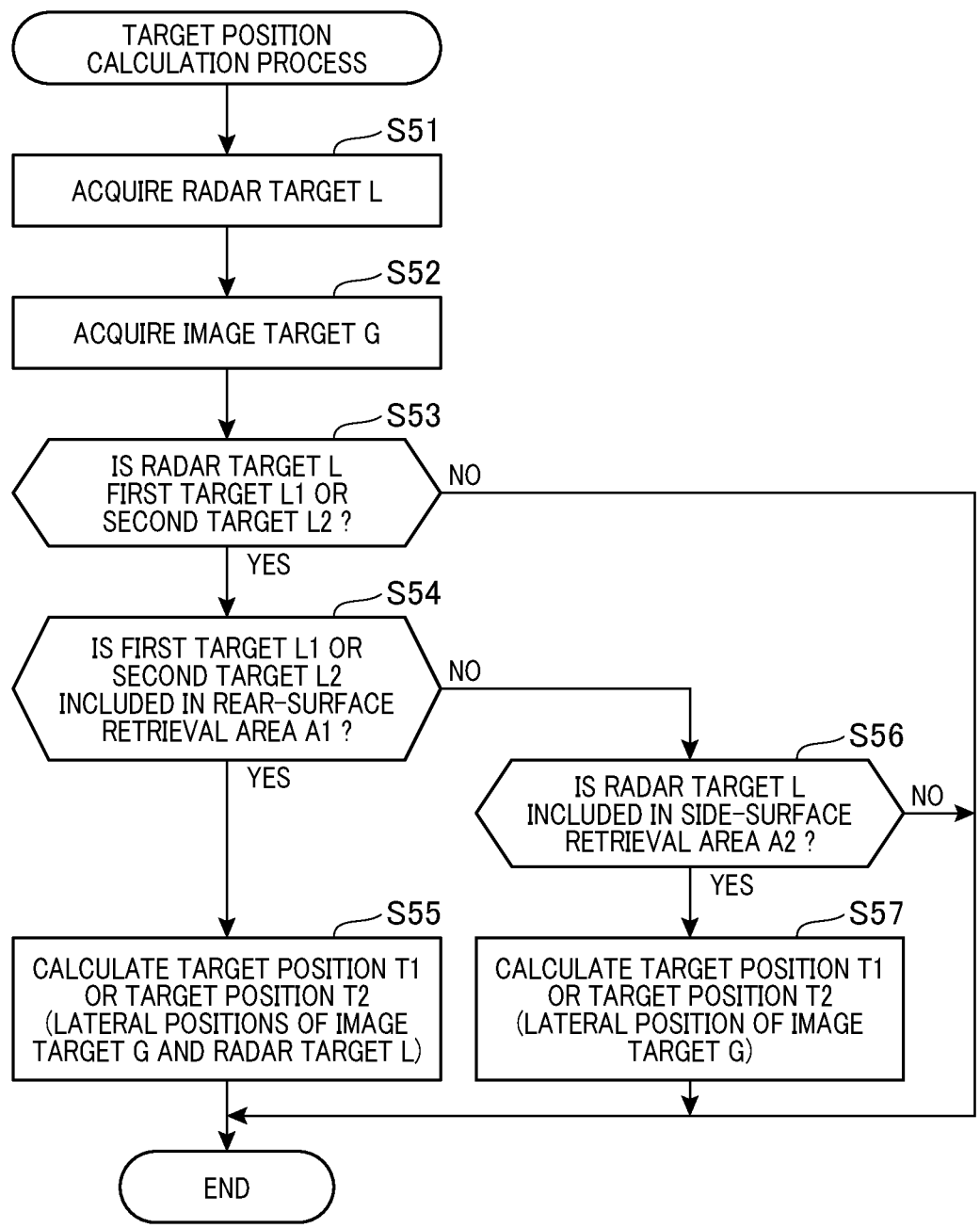

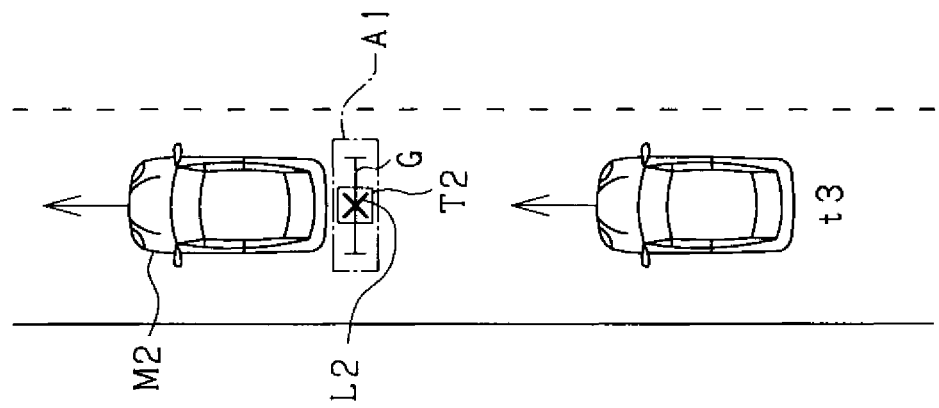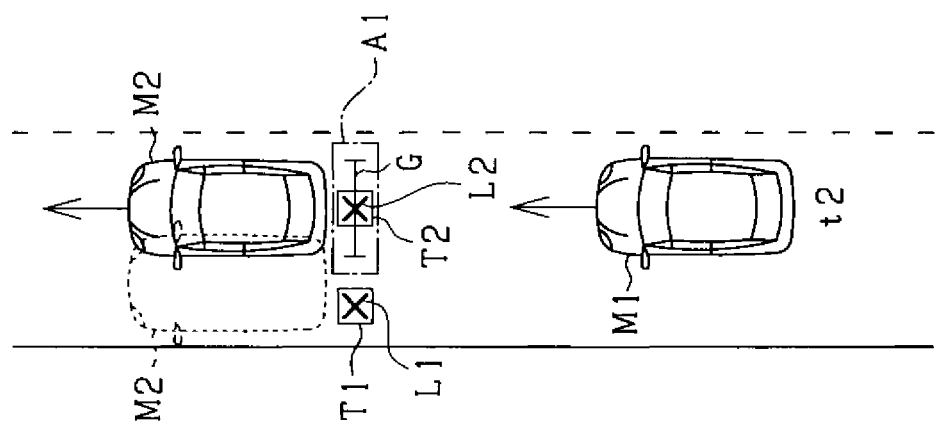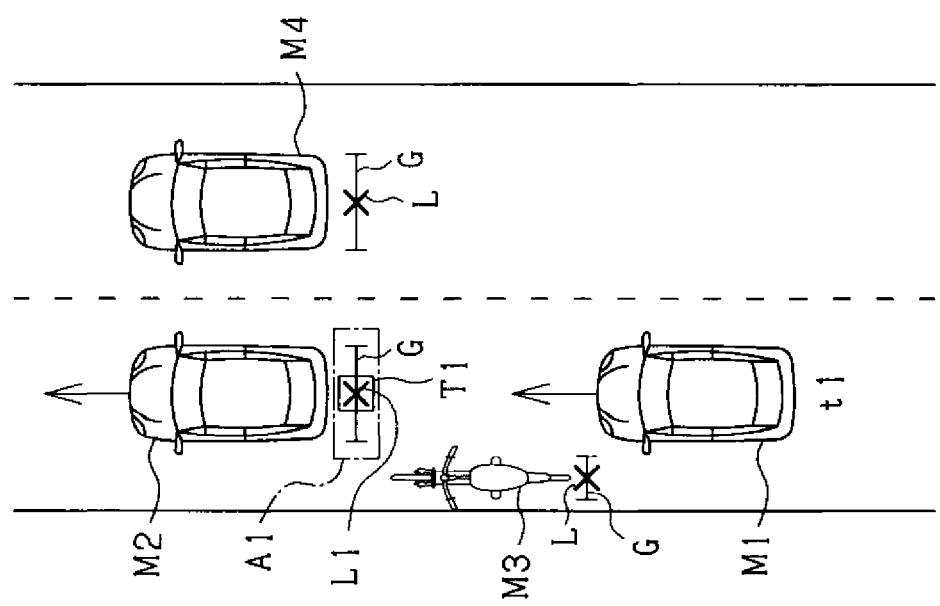

and claims the benefit of Japanese Patent Application No. 2017-176854, filed Sep. 14, 2017. The entire disclosure of the above application is incorporated herein by reference.

TARGET RECOGNITION APPARATUS, TARGET RECOGNITION METHOD, AND VEHICLE CONTROL SYSTEM

CROSS-REFERENCE TO RELATED APPLICATION

This application is based on and claims the benefit of priority from Japanese Patent Application No. 2017-176854, filed Sep. 14, 2017. The entire disclosure of the above application is incorporated herein by reference.

BACKGROUND

Technical Field

The present disclosure relates to a target recognition apparatus that recognizes a target in a periphery of an own vehicle, a target recognition method, and a vehicle control system that controls an own vehicle based on a recognition result of recognition of a target by the target recognition apparatus.

Related Art

Target recognition apparatuses that recognize a target in the periphery of an own vehicle as a radar target using radar waves are known. For example, in JP-A-2005-121496, first radar waves and second radar waves are used. The first radar waves are used to recognize a target that is present in a first area as a radar target. The first area is a wide-field area at a near distance from the own vehicle. The second radar waves are used to recognize a target that is present in a second area as the radar target. The second area is a narrow-field area at a far distance from the own vehicle. Of the radar targets that are recognized using the first and second radar waves, the radar targets that are similar to each other in distance, orientation angle, and relative speed are recognized as being a same target.

Here, the radar waves are affected by the surrounding environment and the like. As a result, a reception state of the radar waves tends to vary. When the reception state of the radar waves becomes unstable and a recognition state of the radar target becomes unstable, the target in the periphery of the own vehicle cannot be continuously recognized using the radar target.

SUMMARY

It is thus desired to provide a target recognition apparatus that is capable of continuously recognizing a target in the periphery of an own vehicle, even when a recognition state of a radar target becomes unstable, a target recognition method, and a vehicle control system that controls an own vehicle based on a recognition result regarding a target.

An exemplary embodiment of the present disclosure provides a target recognition apparatus that recognizes a target in a periphery of an own vehicle. The target recognition apparatus includes: a radar target acquiring unit that acquires, as a radar target, the target that is detected by transmission and reception of radar waves; an image target acquiring unit that acquires, as an image target, the target that is included in a captured image captured by an imaging apparatus; a target recognizing unit that recognizes, as a first target, one of a plurality of radar targets included in a predetermined area relative to the image target and recognizes, as a second target, at least one of the plurality of radar targets other than the first target; and a sameness determining unit that determines whether the first target and the second target are a same object.

As a result of the foregoing, when the same object is recognized as a plurality of radar targets, the plurality of radar targets are determined to be the same object. As a result, even when one radar target becomes unrecognizable, the same object can be continuously recognized using the other radar target that is determined to be the same object.

Specifically, any of the plurality of radar targets that are included in a predetermined area relative to the image target is recognized as the first target. The radar targets other than the first radar target are recognized as the second target. Upon this recognition, the first target and the second target are determined to be the same object.

As a result of the plurality of radar targets included in the predetermined area relative to the image target being recognized as the first target and the second target, and the first target and the second target being determined to be the same object as described above, even when any of the plurality of radar targets recognized as the first target and the second target become unrecognizable, the same object can be continuously recognized using the other radar target.

BRIEF DESCRIPTION OF THE DRAWINGS

In the accompanying drawings:

FIG. 8 is a flowchart of a setting process for a rear-surface retrieval area;

FIG. 9 is a flowchart of a setting process for a side-surface retrieval area;

FIG. 10 is a flowchart of a target position calculation process;

FIG. 11A to FIG. 11C are diagrams of an execution example of processes performed by the target recognition apparatus.

DESCRIPTION OF THE EMBODIMENTS

An embodiment actualizing a target recognition apparatus, a target recognition method, and a vehicle control system will be described with reference to the drawings.

In the description below, the vehicle control system is mounted in an own vehicle, and includes the target recognition apparatus and a vehicle control apparatus. The target recognition apparatus recognizes a target for which control is to be performed in the periphery of the own vehicle.

According to the present embodiment, various types of vehicles serve as the target for which control is to be performed. For example, the types of vehicles include four-wheeled vehicles, large vehicles that have four or more wheels, and light vehicles such as two-wheeled vehicles. The vehicle control apparatus performs known vehicle control, such as collision avoidance control, for the target that is recognized by the target recognition apparatus.

Figure 1:
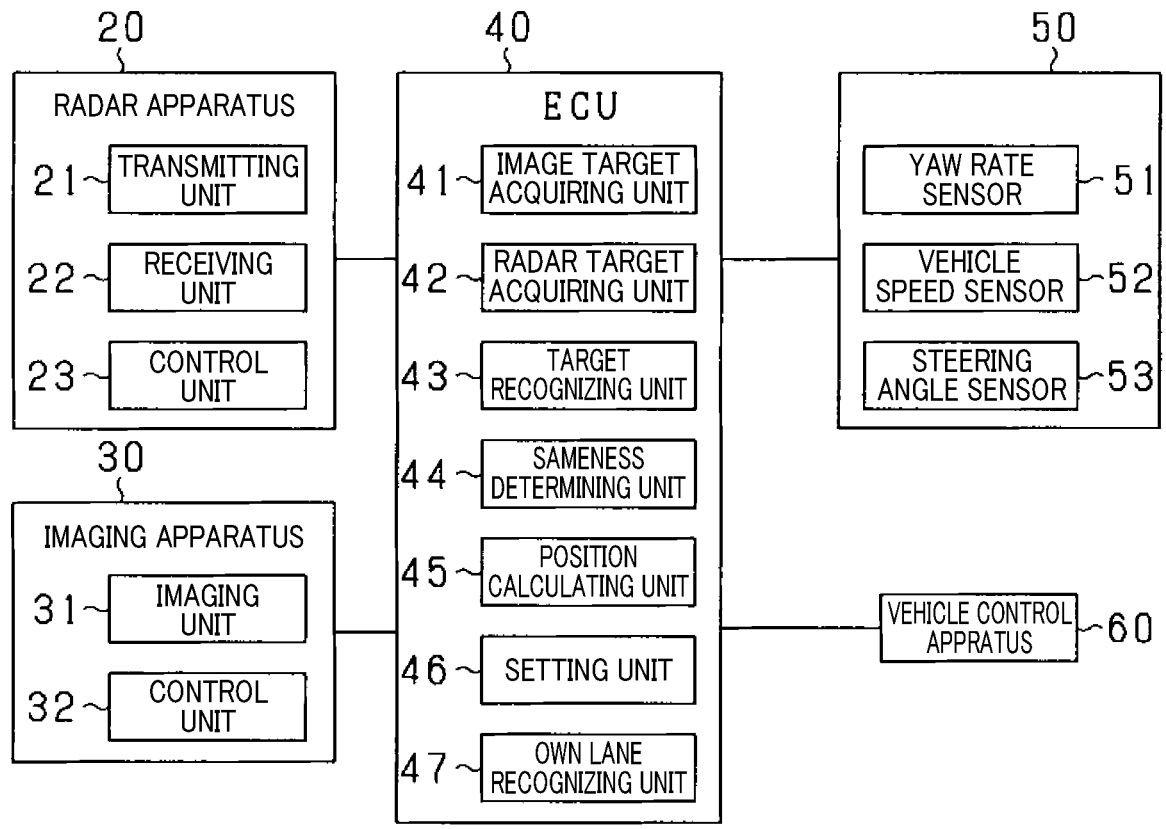
FIG. 1 is a schematic diagram of a target recognition apparatus and a vehicle control system.

In FIG. 1, the vehicle control system includes an electronic control unit (ECU) 40 and a vehicle control apparatus 60. The ECU 40 serves as the target recognition apparatus. The ECU 40 and the vehicle control apparatus 60 are communicably connected. In addition, the ECU 40 is communicably connected to a radar apparatus 20, an imaging apparatus 30, and various types of sensors 50 that detect a driving state of the own vehicle. FIG. 1 shows a yaw rate sensor 51, a vehicle speed sensor 52, and a steering angle sensor 53 as the various types of sensors 50. The yaw rate sensor 51 detects an angular velocity (yaw rate) in a turning direction of the own vehicle. The vehicle speed sensor 52 detects a vehicle speed. The steering angle sensor 53 detects a steering angle.

The radar apparatus 20 recognizes, as a radar target L, a target that is included in a predetermined detection range in the periphery of the own vehicle. The radar apparatus 20 performs the recognition through transmission and reception of radar waves. For example, a millimeter-wave radar that uses high-frequency signals in a millimeter-wave band as the radar waves, or an ultrasonic-wave radar that uses ultrasonic waves as the radar waves can be used.

Figure 2:
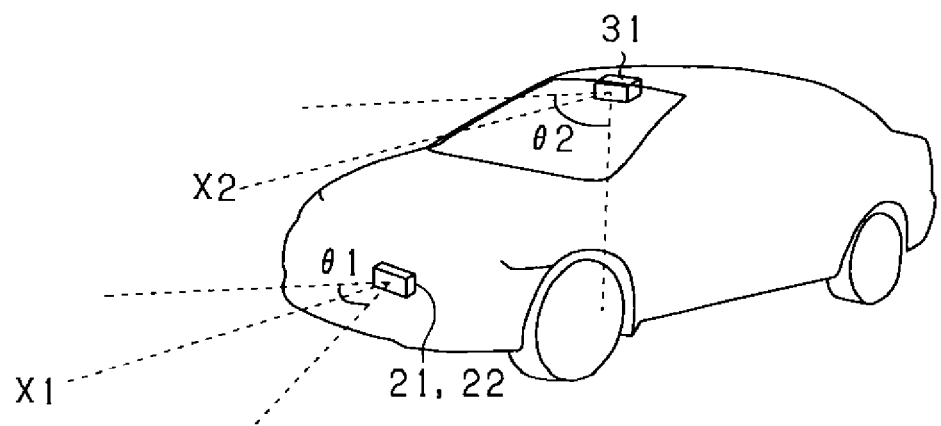
FIG. 2 is a diagram of an arrangement example of a radar apparatus and an imaging apparatus.

The radar apparatus 20 includes a transmitting unit 21, a receiving unit 22, and a control unit 23. The transmitting unit 21 has an antenna element (not shown) that transmits the radar waves ahead of the own vehicle. As shown in FIG. 2, the transmitting unit 21 transmits the radar waves over a predetermined detection range θ1 ahead of the own vehicle. A predetermined reference axis X1 set ahead of the own vehicle serves as the center of the detection range θ1.

The receiving unit 22 has an antenna element (not shown) that receives reflected waves from a target within the detection range θ1. The receiving unit 22 detects a reflection point of the radar wave each time the reflected wave is received. According to the present embodiment, both a target at a far distance from the own vehicle and a target at a near distance from the own vehicle can be detected as a result of transmission strength of the radar waves transmitted by the single radar apparatus 20 being changed.

Transmission and reception of the radar waves are repeatedly performed at each predetermined scanning angle within the detection range θ1. Therefore, when a target is present within the detection range θ1, the reflection point is detected at each scanning angle. When the receiving unit 22 detects a plurality of reflection points, the control unit 23 sets the reflection points that are in positions near each other as a set of reflection points acquired from the same target and recognizes the radar target L for each set of reflection points.

For example, the control unit 23 associates the reflection point of each radar wave with an orthogonal coordinate system (not shown) in which a vehicle-width direction is an X axis, a vehicle-height direction is a Y axis, and a direction ahead of the own vehicle is a Z axis. The control unit 23 groups reflection points of which a distance in the X-axis direction between the reflection points is equal to or less than a predetermined allowable value Δx, a distance in the Y-axis direction is equal to or less than a predetermined allowable value Δy, and a distance in the Z-axis direction is equal to or less than a predetermined allowable value Δz, on the orthogonal coordinate system.

Then, the control unit 23 selects a representative point from the plurality of reflection points that belong to the same group. Based on the representative point, the control unit 23 recognizes a distance between the target and the own vehicle, a relative speed and relative acceleration of the target relative to the own vehicle, a direction of the target relative to the own vehicle, and the like as the radar target L. The control unit 23 outputs the recognized radar target L to the ECU 40.

In addition, the control unit 23 performs a tracking process in which the radar target L is associated in time series for each target. The tracking process will be described with reference to FIG. 3. First, the control unit 23 determines an estimated position P1 (X,Y) at which a current radar target L is presumed to be present, under an assumption that the radar target L has moved from a position P0 of the previous radar target LA at the relative speed of the previous radar target LA.

Next, the control unit 23 sets an estimated movement area AR in the periphery of the estimated position P1 (X,Y). The estimated movement area AR includes a predetermined range of error. Then, when a radar target L that is included in the estimated movement area AR is present among the radar targets L that are currently acquired, the control unit 23 recognizes the radar target L as being the same target as the radar target LA that has been previously acquired. In the example in FIG. 3, of the radar targets LB1 and LB2 that are currently recognized, the radar target LB1 is recognized as being the same target as the previous radar target LA.

Here, the radar waves are affected by the surrounding environment and the like. As a result, the reception state of the radar waves tends to vary. Therefore, the reception state of the radar waves may become unstable, and the radar target L may temporarily no longer be recognized. However, when the radar target L had been continuously (stably) recognized in the past, the likelihood of the target being present in the periphery of the own vehicle is high. Therefore, even when the radar target L is temporarily unrecognized, the target recognized by the radar target L is preferably continuously recognized.

Here, the control unit 23 performs an estimation process. In the estimation process, the control unit 23 repeatedly calculates the estimated position of the radar target L during a predetermined period even when the radar target L corresponding to the estimated position is not recognized. The estimation process will be described in detail with reference to FIG. 3. First, when the radar target L included in the estimated movement area AR is not present in the previous process, the control unit 23 calculates the estimated position P1 of the current radar target L under an assumption that the relative speed and lateral position of the radar target L recognized in the past (previous) process have not changed.

Then, the control unit 23 sets the estimated movement area AR based on the estimated position P1. The control unit 23 retrieves the radar target L that is included in the estimated movement area AR. When the radar target L included in the estimated movement area AR is not recognized, the control unit 23 repeats a similar process. Then, when the radar target L included in the estimated movement area AR is again recognized, the control unit 23 associates the radar target L and the past radar target L and stores the radar target L. Meanwhile, when the radar target L included in the estimated movement area AR is not recognized even when the estimation process is repeatedly performed at the predetermined period, the control unit 23 deletes the information on the radar target L. As a result of the estimation process such as this, the effect of recognizing the same target in time series using the radar target L can be improved.

Returning to the description regarding FIG. 1, the imaging apparatus 30 recognizes a target in the periphery of the own vehicle as an image target G. The imaging apparatus 30 includes an imaging unit 31 and a control unit 32. In the imaging unit 31, a charge-coupled device (CCD) camera, a complementary metal-oxide-semiconductor (CMOS) image sensor, a near-infrared camera, or the like is used.

As shown in FIG. 2, the imaging unit 31 is attached to the center of the own vehicle in the vehicle-width direction at a predetermined height. The imaging unit 31 acquires a captured image by imaging an area that spreads ahead of the own vehicle over a predetermined imaging range $\theta 2$ ($>\theta 1$). The captured image acquired by the imaging unit 31 is outputted to the control unit 32. According to the present embodiment, an example in which the overall detection range $\theta 1$ is included in the imaging range $\theta 2$ is shown (see FIG. 2).

The control unit 32 performs a known matching process every time the imaging unit 31 outputs a captured image. The control unit 32 thereby recognizes, as the image target G, a target for which control is to be performed that is included in the captured image. For example, to enable recognition of the target for which control is to be performed as the image target, information regarding a rear-surface image of the target (vehicle) for which control is to be performed is stored as a template in a read-only memory (ROM) of the imaging apparatus 30.

When the captured image is acquired, the control unit 32 collates the captured image with the template of the rear-surface image. The control unit 23 thereby recognizes, as the image target G, the target (vehicle) for which control is to be performed that is included in the captured image. The size of the target in the vehicle-width direction and the vehicle-height direction can be recognized using the image target G. Therefore, through use of the image target G, the size of the target (lateral position and lateral width) can be recognized in addition to the distance between the target and the own vehicle. Furthermore, the type of the target can be recognized based on the image information. The image target G recognized by the control unit 32 is outputted to the ECU 40.

The ECU 40 is a computer that includes a central processing unit (CPU), a ROM, a random access memory (RAM), an input/output (I/O), and the like. The ECU 40 provides functions of an image target acquiring unit 41, a radar target acquiring unit 42, a target recognizing unit 43, a sameness determining unit 44, a position calculating unit 45, a setting unit, and an own lane recognizing unit 47. These functions are implemented by the CPU running programs stored in the ROM. The ECU 40 receives parameters, such as the radar target L, the image target G, the yaw rate, the vehicle speed, and the steering angle, and stores the pieces of information in the RAM.

The image target acquiring unit 41 acquires the image target G recognized by the imaging apparatus 30. When a plurality of image targets G are acquired, the image targets G are individually recognized by each image target G being given a separate identification (ID) or the like.

The radar target acquiring unit 42 acquires the radar target L recognized by the radar apparatus 20. In a manner similar to the image target G, when a plurality of radar targets L are acquired, the radar targets L are individually recognized by each radar target L being given a separate identification (ID) or the like.

The setting unit 46 sets a retrieval area A in a predetermined area including the image target G. The retrieval area A is used to retrieve the radar target L that is acquired for the same target (object) as the image target G, among the radar targets L. The details of the retrieval area A set by the setting unit 46 will be described hereafter.

The target recognizing unit 43 recognizes, as a first target L1, any of a plurality of radar targets L included in a predetermined area relative to the image target G. The target recognizing unit 43 recognizes, as second targets L2, the radar targets L other than the first target L1.

According to the present embodiment, the target recognizing unit 43 recognizes the first target L1 and the second target L2 from the radar targets L that are included in the retrieval area A set by the setting unit 46. Specifically, the target recognizing unit 43 recognizes the radar target L as the first target L1 when a single radar target L is included in the retrieval area A. Meanwhile, when a plurality of radar targets L are included in the retrieval area A, any of the plurality of radar targets L is recognized as the first target L1 and the other radar targets are recognized as the second targets L2.

For example, of the radar targets L included in the retrieval area A, the radar target L that has a highest degree of coincidence regarding position with the image target G can be selected as the first target L1. More specifically, in the retrieval area A, the radar target L that is within a predetermined first area is recognized as the first target L1. The radar target L that is within a predetermined second range at a farther distance than the first range is recognized as the second target L2.

Alternatively, of the radar targets L included in the retrieval area A, the radar target L that has the highest reception strength regarding the radar waves can be selected as the first target L1. The other radar targets L can be selected as the second target L2. Furthermore, of the radar targets L included in the retrieval area A, the radar target L that is most stably recognized in the tracking process may be selected as the first target L1. The other radar targets L may be selected as the second target L2. These conditions may be combined as appropriate.

The sameness determining unit 44 determines that the first target L1 and the second target L2 are the same object when the first target L1 and the second target L2 are present. As a result of the plurality of radar targets L acquired from the same object being associated in this way, even when one radar target L (such as the first radar target L1) is not recognized (that is, when the recognition state is unstable), the same object can be continuously recognized using the other radar target L (the second target L2).

The position calculating unit 45 calculates a first position T1 as a target position T based on the first target L1 and the image target G (first calculating unit). In addition, the position calculating unit 45 calculates a second position T2 as the target position T based on the second target L2 and the image target G when the second target L2 is recognized (second calculating unit).

Here, in the radar apparatus 20, due to the effects of the positional relationship between the own vehicle and the target, the shape of the target, the surrounding environment, and the like, as a result of the plurality of reflection points received from the same target being grouped into differing sets, the same object may be recognized as a plurality of radar objects L.

Meanwhile, as described above, the reflection points of the radar waves tend to vary. Therefore, the recognition state of the radar target L that has been recognized up to this point may become unstable. In this case, when the recognition state of the radar target L recognized as the first target L2 becomes unstable, the target position T (first position T1) cannot be calculated based on the first target L2 and the image target G. Vehicle control based on the target position T may not be able to be continued.

Therefore, when the second target L2 is present, the position calculating unit 45 calculates the second position T2 as the target position T based on the second target L2 and the image target G. In this case, even when the recognition state of the first target L2 becomes unstable and the target position T (first position T1) is incalculable based on the first target L1 and the image target G, the vehicle control can be continued using the target position T (second position T2) calculated based on the second target L2 and the image target G.

In addition, when the plurality of target positions T are calculated, the vehicle control apparatus 60 can perform inter-vehicle distance control based on the target position T at which the inter-vehicle distance to the own vehicle is the shortest, among the target positions T. Therefore, accuracy of the inter-vehicle distance control can be improved.

Figure 4:
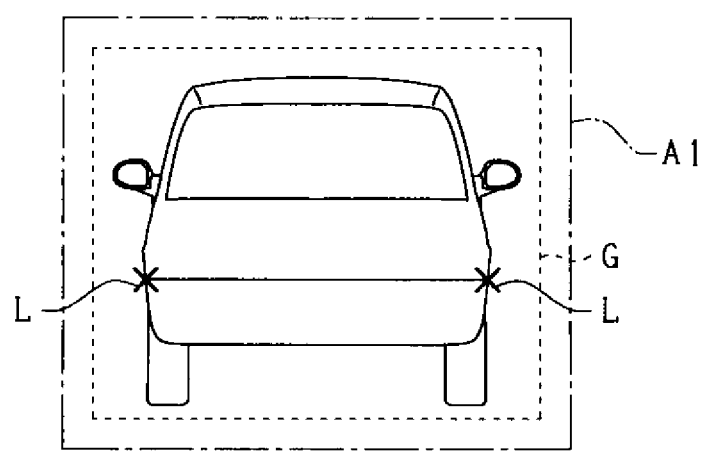
FIG. 4 is an explanatory diagram related to setting of a retrieval area.

Here, setting of the retrieval area A by the setting unit 46 will be described in detail. According to the present embodiment, various types of vehicles serve as the target for which control is performed. Therefore, as shown in FIG. 4, when the image target G is acquired, a rear-surface retrieval area A1 is set as the retrieval area A for a predetermined area that includes the rear surface of the vehicle body of the target (vehicle) recognized as the image target G.

Here, of the vehicles, it is assumed that a plurality of radar targets L are unlikely to be simultaneously recognized regarding vehicles that have a narrow vehicle width, such as a motorcycle or a two-wheeled vehicle, driving ahead of the own vehicle. In addition, the two-wheeled vehicle may drive alongside a preceding vehicle (such as a four-wheeled vehicle) at a position near the preceding vehicle.

In such cases, the radar target L acquired from the motorcycle or the two-wheeled vehicle may be erroneously recognized as the second target L2. Therefore, when the type of the target recognized by the image target G or the like is a two-wheeled vehicle, the setting unit 46 does not set the retrieval area A (rear-surface retrieval area A1) for the target.

In addition, even when the type of the target is a vehicle, when the rear surface is narrow in the vehicle-width direction, the likelihood of the rear surface of the vehicle body being recognized as a plurality of radar targets L is low. Therefore, the setting unit 46 may set the rear-surface retrieval area A1 if the rear surface of the vehicle body is equal to or greater than a predetermined size in the vehicle-width direction.

In addition, it is assumed that a target that is positioned in the own lane becomes an obstacle for the own vehicle. Therefore, the setting unit 46 sets the retrieval area A (rear-surface retrieval area A1) if the target is in the own lane.

Whether or not the target is in the own lane can be determined using the calculation results of own lane probability calculated by the own lane recognizing unit 47. The own lane probability is a parameter that is set such that the probability decreases as the radar object L moves to the left or right in the vehicle-width direction with reference to a predicted course of the own vehicle. The target can be recognized as being in the own lane if the own lane probability is equal to or greater than a predetermined probability.

The predicted course of the own vehicle can be determined based on a detection value of the yaw rate detected by the yaw rate sensor 51, a detection history of white lines detected through image processing of the captured images, a detection history of a driving position of another vehicle (a vehicle ahead) that is driving ahead of the own vehicle, and the like. Methods for calculating the predicted course of the own vehicle such as this are known. A detailed description thereof is omitted.

When the target is determined to be in the own lane, the setting unit 46 sets the retrieval area A for the target. Meanwhile, when the target is determined to not be in the own lane, the setting unit 46 does not set the retrieval area A for the target. As a result of the foregoing, the target recognizing unit 43 can exclude a target (such as a target positioned in an adjacent lane) that is unlikely to be an obstacle for the own vehicle from a same-object determination process.

Here, when the type of the target is a large vehicle that is equal to or greater than a predetermined size in a vehicle-length direction, a side surface of the vehicle body, in addition to the rear surface of the vehicle body, may be recognized as the radar target L depending on the positional relationship between the own vehicle and the large vehicle. When the type of the target is not a large vehicle, the likelihood of the side surface of the vehicle body being recognized as the radar target L is low.

Therefore, when the type of the target is a large vehicle that is equal to or greater than the predetermined size in the vehicle-length direction, the setting unit 46 sets the rear-surface retrieval area A1 regardless of whether or not the target is in the own lane. Furthermore, the setting unit 46 sets a side-surface retrieval area A2 as the retrieval area A for a predetermined area corresponding to the side surface of the vehicle body of the large vehicle.

For example, the side-surface retrieval area A2 is set in a predetermined area in the vehicle-length direction that corresponds to the side surface of the large vehicle, with reference to the rear-surface retrieval area A1. Whether or not the target is a large vehicle can be recognized based on the information regarding the image target G.

When the type of the target is not the large vehicle, when setting the side-surface retrieval area A2 for the side surface of the vehicle body, the side-surface retrieval area A2 is set to the predetermined area corresponding to the side surface of the large vehicle. Therefore, a plurality of differing targets (a plurality of differing vehicles) may be included in the side-surface retrieval area A2. In this case, the differing targets may be erroneously recognized as being the same object.

In this regard, according to the present embodiment, the side-surface retrieval area A2 is not set when the type of the target is not a large vehicle. Therefore, the occurrence of such erroneous recognition can be prevented. In addition, unnecessary calculation processes being performed in a state in which the side surface of the vehicle body is unlikely to be recognized as the radar target L can also be avoided.

Here, when the target is a large vehicle, the side surface of the vehicle body of the large vehicle is recognized as the radar target L in a state in which the vehicle body of the large vehicle that is driving ahead of the own vehicle in the advancing direction is positioned so as to be angled relative to the own vehicle.

That is, the side surface of the vehicle body of the large vehicle is recognized as the radar target L in a state in which the advancing direction of the own vehicle and the advancing direction of the large vehicle do not coincide. Therefore, the setting unit 46 may set the side-surface retrieval area A2 if a tilt angle $\theta$ of the vehicle body of the large vehicle relative to the own vehicle is equal to or greater than a predetermined tilt angle, ahead of the own vehicle in the advancing direction.

The tilt angle θ of the vehicle body can be recognized based on a movement history of the target position T. For example, the tilt angle θ of the vehicle body is determined by, with reference to the advancing direction of the own vehicle, the tilt of the advancing direction of the other vehicle relative to the reference being calculated or the like.

Alternatively, the tilt angle θ of the vehicle body can be recognized based on information such as the shape of boundary lines of the own lane. For example, regarding the shape of the boundary lines on the own lane, edge points that serve as candidates for the boundary lines are extracted based on a rate of change in luminosity or the like in a horizontal direction of the image. As a result of Hough transform being performed on the extracted edge points and feature points being connected, recognition can be performed.

In addition, in a state in which the own vehicle is driving at a low vehicle speed in which an own vehicle speed V is lower than a predetermined vehicle speed, the inter-vehicle distance between the own vehicle and another vehicle (a preceding vehicle or a vehicle ahead of the preceding vehicle) driving ahead of the own vehicle is relatively short.

In cases in which the side-surface retrieval area A2 is set under such circumstances as well, a plurality of differing targets may be included in the side-surface retrieval area A2 (for example, a plurality of differing vehicles such as the preceding vehicle and a vehicle ahead of the preceding vehicle may be included). In this case, the target recognizing unit 43 may erroneously recognize the radar target L recognized as a differing target (a vehicle ahead of the preceding vehicle) as the same object. Therefore, the setting unit 46 may set the side-surface retrieval area A2 if the own vehicle speed V is equal to or greater than a predetermined vehicle speed.

Furthermore, when the target is a vehicle, it is assumed that the side surface of the vehicle body is recognized as the radar target L in a state in which a curvature radius of the traffic lane in which the target is positioned is less than a predetermined curvature radius, that is, the target is positioned on a curve. Therefore, the setting unit 46 may set the side-surface retrieval area A2 if the curvature radius of the traffic lane (own lane) at the target position T is less than a predetermined curvature radius, that is, a curve is present ahead of the own vehicle.

Whether or not a curve is present ahead of the own vehicle can be determined based on the movement history of the target position T. In addition, whether or not a curve is present ahead of the own vehicle can be determined through recognition of the shape of the white lines ahead of the own vehicle through image processing of the captured images.

In addition to the foregoing, the radar target L acquired from a target other than the first target L1 may be erroneously recognized as being the second target L2. For example, in a state in which a plurality of vehicles are driving side by side ahead of the own vehicle, when the radar target L acquired from a target other than the first target L1 is included in the predetermined area relative to the image target G, the radar target L may be erroneously recognized as being the same object.

When the first target L1 and the second target L2 are separate targets, the positional relationship and speed relationship between the first target L1 and the second target L2 are highly likely to subsequently change.

Therefore, the target recognizing unit 43 may recognize, as the first target L1 and the second target L2, the radar targets L of which the distance therebetween is within a predetermined range and a difference in speed therebetween is less than a predetermined amount, among the plurality of radar targets L included in the predetermined area relative to the image target G.

For example, the radar target L can be recognized as the second target L2 if, with reference to the first target L1, the distance from the first target L1 is within a predetermined range (in a position at a near distance from the first target L1) and the difference in speed with the first target L1 is less than a predetermined amount (indicating behavior similar to that of the first target L1).

In addition, regarding separate targets, the radar targets L recognized for the separate targets are associated with differing image targets G. Therefore, the target recognizing unit 43 may exclude, from the determination regarding the first target L1 and the second target L2, the radar target L that is included in a predetermined area relative to an image target G differing from the image target G used to calculate the first position T1 as the target position T.

Here, whereas the radar target L tends to have a relatively high recognition accuracy regarding the position of the target in the advancing direction of the own vehicle, the image target G tends to have a relatively high recognition accuracy regarding the position of the target in the vehicle-width direction of the own vehicle.

In addition, whereas the position in the vehicle-width direction of the radar target L included in the rear retrieval area A1 is highly likely to be included in the image target G, the position (lateral position) in the vehicle-width direction of the radar target L included in the side-surface retrieval area A2 is likely to not coincide with the image target G.

Therefore, when calculating the target position T based on the radar target L (the first target L1 and the second target L2) included in the rear-surface retrieval area A1 and the image target G, the position calculating unit 45 determines the target position T in the advancing direction of the own vehicle mainly using the information regarding the radar target L.

The position calculating unit 45 determines the target position T in the vehicle-width direction of the own vehicle mainly using the information regarding the image target G. In this way, the recognition accuracy regarding the target position T in the periphery of the own vehicle can be improved through combination of the positional information of the first target L2 and the image target G.

Meanwhile, when calculating the target position T based on the radar target L (the first target L1 and the second target L2) included in the side-surface retrieval area A2 and the image target G, the position calculating unit 45 recognizes the target position T in the advancing direction of the own vehicle mainly recognized using the information regarding the second target L2. Meanwhile, the position calculating unit 45 recognizes the target position T in the vehicle-width direction based on the position in the vehicle-width direction of the image target G without using the position information of the second target L2.

As a result of the foregoing, even regarding the radar target L that is recognized in the side-surface retrieval area A2, the lateral position of the target can be recognized as accurately as possible using the target position T calculated based on the radar target L and the image target G.

The vehicle control apparatus 60 selects the target position T that is positioned in the own lane and of which the distance to the own vehicle is less than a predetermined distance as the preceding vehicle, among the target positions T. Then, for the preceding vehicle, the vehicle control apparatus 60 controls the own vehicle V such that a predetermined inter-vehicle distance is maintained, that is, the vehicle control apparatus 60 performs so-called adaptive cruise control (ACC). When a plurality of target positions T that meet the selection conditions for the preceding vehicle are present, the target position T of which the inter-vehicle distance with the own vehicle is the shortest may be selected as the preceding vehicle.

In addition, when there is no selected preceding vehicle as a result of lane change or the like, the vehicle control apparatus 60 controls the own vehicle to drive in a steady manner upon performing acceleration and deceleration such that the own vehicle speed V is a predetermined vehicle speed. When the target position T to be selected as the preceding vehicle is not present among the target positions T in the first place, the vehicle control apparatus 60 performs control such that the own vehicle drives in a steady manner.

Furthermore, the vehicle control apparatus 60 performs various types of vehicle control based on a likelihood of collision with the target position T, regardless of whether or not the target position T is selected as a preceding vehicle.

For example, when the likelihood of collision with the target position T is low, the vehicle control apparatus 60 issues a warning of the presence of the target using audio, an image, or the like. When the likelihood of collision with the target position T is high, the vehicle control apparatus 60 automatically performs collision avoidance of a collision between the target and the own vehicle by performing automatic control of onboard actuators such as those for brakes and steering. The vehicle control apparatus 60 may also operate safety apparatuses such as seatbelts.

Figure 5:
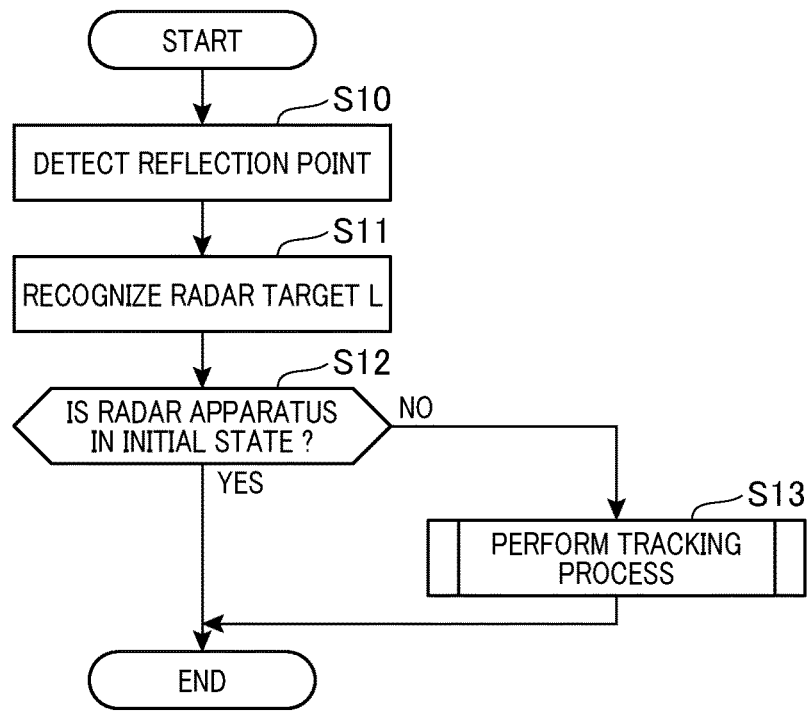
FIG. 5 is a flowchart of processes performed by the radar apparatus.
Figure 6:
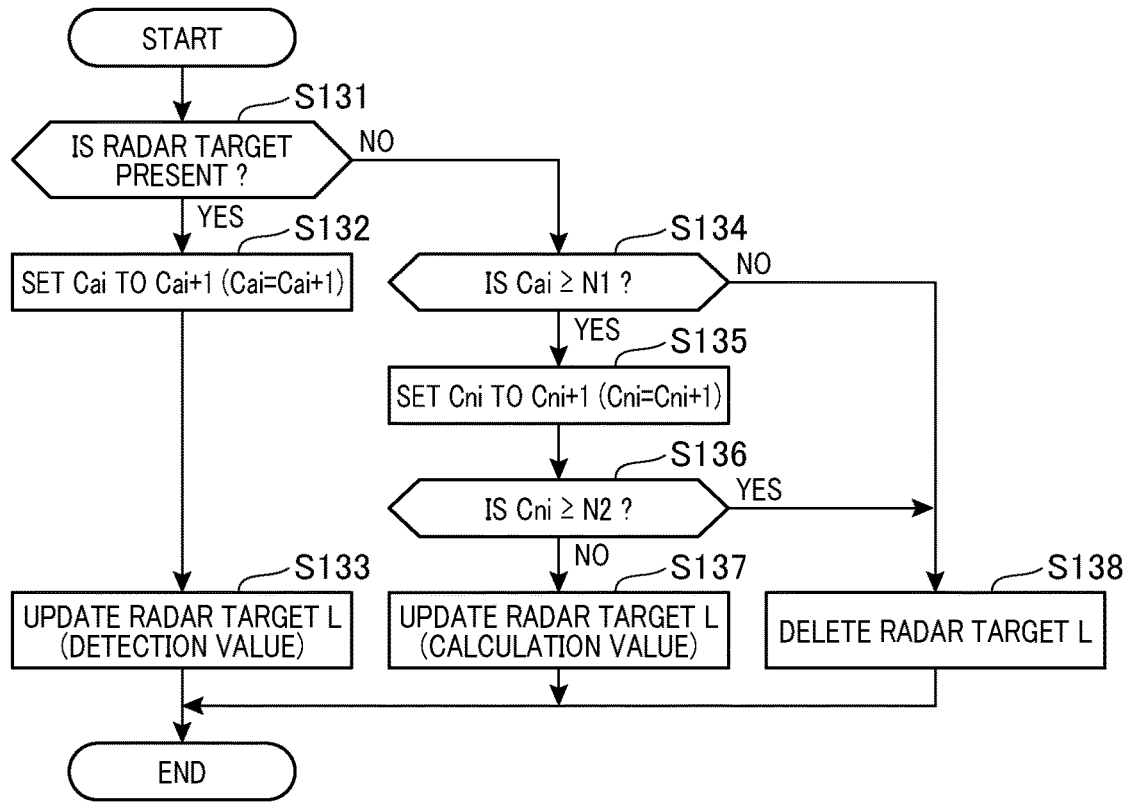
FIG. 6 is a flowchart of processes performed by the radar apparatus.
Figure 7:
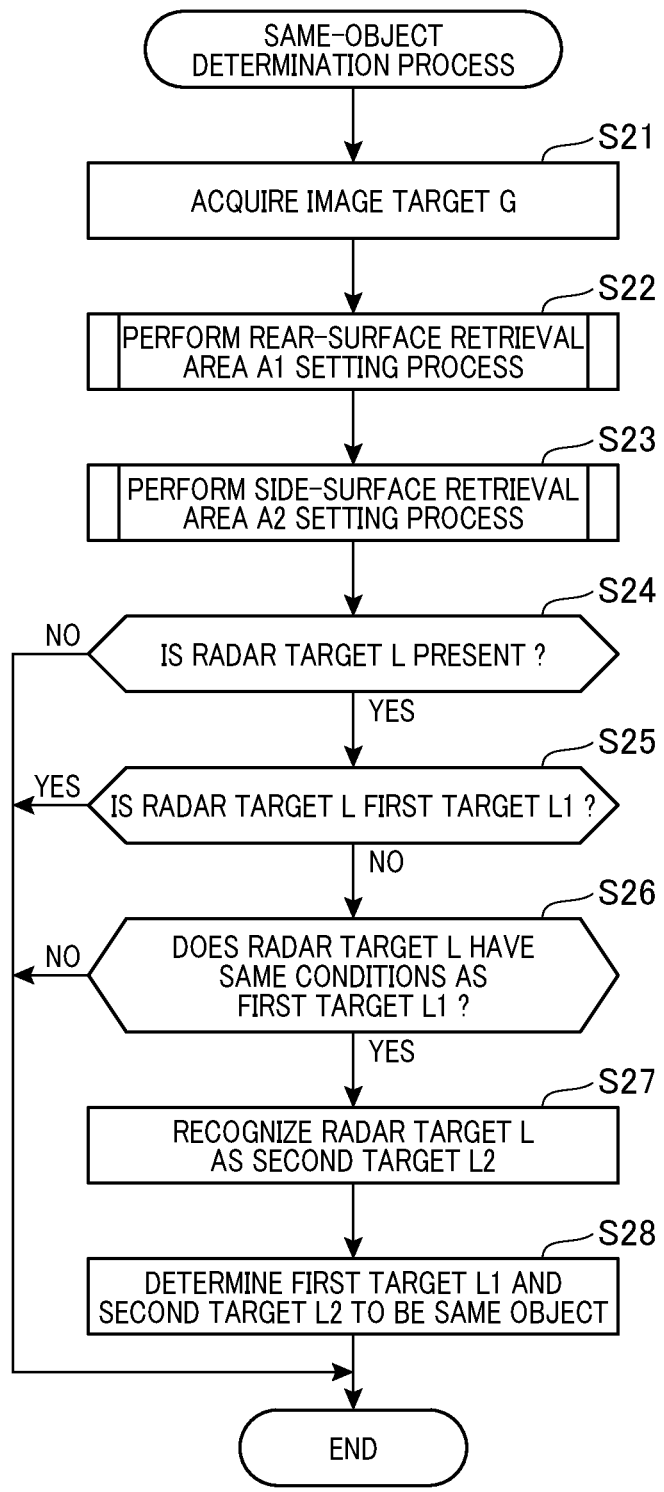
FIG. 7 is a flowchart of a same-target determination process.

Next, processes performed by the radar apparatus 20 and the ECU 40 will be described. FIG. 5 and FIG. 6 are flowcharts of the processes performed by the radar apparatus 20. The radar apparatus 20 repeatedly performs these processes every time transmission and reception of radar waves are performed. FIG. 7 to FIG. 9 are flowcharts of the processes performed by the ECU 40. The ECU 40 repeatedly performs the processes at a predetermined period.

First, the tracking process performed by the radar apparatus 20 will be described. In a main routine shown in FIG. 5, the radar apparatus 20 detects the reflection points of the radar waves (step S10). Upon detecting the reflection points, the radar apparatus 20 forms a group of reflection points that are near each other and recognizes the radar target L (step S11).

Next, the radar apparatus 20 determines whether or not the radar apparatus 20 is in an initial state (step S12). The radar apparatus 20 determines YES at step S12 at startup of the radar apparatus 20. When determined that the radar apparatus 20 is in the initial state (YES at step S12), the radar apparatus 20 ends the process. That is, when the operation is in the initial state, the radar apparatus 20 generates a new radar target L and ends the process. Meanwhile, when determined that the radar apparatus 20 is not in the initial state (NO at step S12), the radar apparatus 20 updates the radar target L by the tracking process.

Figure 3:
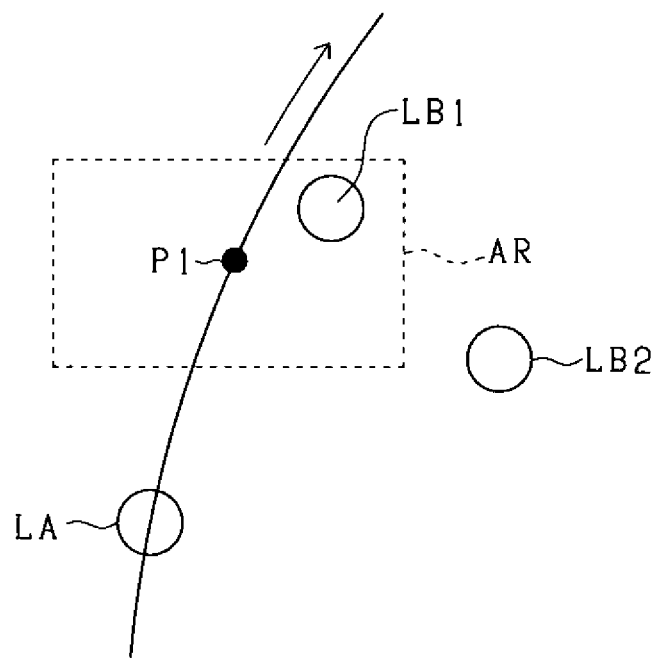
FIG. 3 is an explanatory diagram of a tracking process performed by the radar apparatus.

Specifically, in a sub-routine in FIG. 6, first, as shown in the example in FIG. 3, the radar apparatus 20 determines whether or not the radar target L that corresponds to the estimated position P (estimated movement area AR) of the current radar target L is present (step S131).

When determined that the corresponding radar target L is present (YES at step S131), the radar apparatus 20 increments a recognition counter Cai (sets Cai to Cai+1, i.e., Cai=Cai+1) (step S132). The recognition counter Cai is a counter that counts the number of periods (cycles) at which the tracking process is repeatedly performed and during which the radar target L is recognized. Then, the radar apparatus 20 associates the current radar target L with the previous radar target L and updates the radar target L (step S133).

Meanwhile, when determined that the radar target L that corresponds to the estimated position P1 (estimated movement area AR) is not present (NO at step S131), the radar apparatus 20 determines whether or not the counted value of the recognition counter Cai is equal to or greater than a predetermined determination value N1 (step S134).

When determined that the counted value of the recognition counter Cai is less than N1 (i.e., Cai<N1) (NO at step S134), the radar apparatus 20 deletes all pieces of data related to the radar target L (step S138). That is, the radar apparatus 20 gradually increments the recognition counter Cai while the radar target L corresponding to the estimated position P1 is being recognized.

However, when determined that the radar target L corresponding to the estimated position P1 is not recognized in a range of N1 periods (cycles) or less, the radar apparatus 20 deletes the data related to the radar target L. As a result of this process, the data of the radar target L that is temporarily (momentarily) recognized is deleted. Therefore, unnecessary target data of roadside objects can be eliminated.

Meanwhile, when determined that the value of the recognition counter Cai is equal to or greater than N1 (i.e., Cai≥N1) (YES at step S134), the radar apparatus 20 increments a non-recognition counter Cni (sets Cni to Cni+1, i.e., Cni=Cni+1) (step S135). The non-recognition counter Cni is a counter that counts the number of periods (cycles) at which the tracking process is repeatedly performed and during which the radar target L is no longer recognized.

Next, the radar apparatus 20 determines whether or not the counted value of the non-recognition counter Cni is equal to or greater than a predetermined determination value N2 (step S136).

When determined that the counted value of the non-recognition counter Cni is equal to or greater than N2 (i.e., Cni≥N2) (YES at step S136), that is, when determined that the radar target L corresponding to the estimated position P1 is continuously not recognized in a range of N2 periods (cycles) or more, the radar apparatus 20 proceeds to step S138. The radar apparatus 20 then deletes the data related to the radar target L.

Meanwhile, when determined that the non-recognition counter Cni is less than N2 (i.e., Cni<N2) (NO at step S136), the radar apparatus 20 updates the radar target L through calculation (step S137). For example, the radar apparatus 20 calculates the position of the current radar target L under an assumption that the relative speed relative to the target and the lateral speed recognized by the previous radar target L remain unchanged.

As a result of the above described process, even when the radar apparatus 20 temporarily (i.e., in a range of N2 periods or less) loses track of the radar target L of which the presence has been recognized through tracking in a range of N1 periods (cycles) or more, when the radar apparatus 20 rediscovers the radar target L (YES at step S131), the radar apparatus 20 can recognize the radar target L as the radar target L corresponding to the same target.

As a result of the processes in FIG. 5 and FIG. 6 being performed on all radar targets L currently recognized by the radar apparatus 20, each target can be recognized in time series by the radar targets L.

Next, the steps in the same-object determination process will be described with reference to FIG. 7. First, the ECU 40 acquires the image target G (step S21). The ECU 40 then sets the rear-surface retrieval area A1 for the predetermined area including the rear surface of the vehicle body of the target (vehicle) recognized as the image target G (step S22). Specifically, in a sub-routine in FIG. 8, first, the ECU 40 determines whether or not the type of the target is a two-wheeled vehicle (step S31). When determined that the type of the target is not a two-wheeled vehicle (that is, when determined that the type of the target is a vehicle) (NO at step S31), the ECU 40 determines whether or not the vehicle width of the vehicle body recognized by the image target G is greater than a predetermined first threshold Th1 (step S32).

When determined that the vehicle width is greater than the predetermined first threshold Th1 (YES at step S32), the ECU 40 determines whether or not the type of the target is a large vehicle (step S33). When determined that the type of the target is not a large vehicle (NO at step S33), the ECU 40 determines whether or not the image target G is positioned in the own lane (step S34).

When determined that the image target G is positioned in the own lane (YES at step S34), the ECU 40 sets the rear-surface retrieval area A1 for the rear surface of the target (vehicle) (step S35). Meanwhile, when determined that the type of the target is a large vehicle (YES at step S33), the ECU 40 sets the rear-surface retrieval area A1 for the rear surface of the target (vehicle) (step S34). That is, when the type of the target is a large vehicle, the ECU 40 sets the rear-surface retrieval area A1 regardless of whether or not the image target G is positioned in the own lane.

Meanwhile, when determined that the type of the target is a two-wheeled vehicle (YES at step S31) or when determined that the vehicle width is equal to or less than the predetermined first threshold Th1 (NO at step S32), the ECU 40 does not set the rear-surface retrieval area A1. In addition, when the type of the target is not a large vehicle and the target is not positioned in the own lane, the ECU 40 does not set the rear-surface retrieval area A1.

Returning to the process in FIG. 7, next, the ECU 40 performs the setting process for the side-surface retrieval area A2 (step S23). Specifically, in a sub-routine in FIG. 9, first, the ECU 40 determines whether or not the rear-surface retrieval area A1 is set (step S41).

When determined that the rear-surface retrieval area A1 is set (YES at step S41), the ECU 40 determines whether or not the type of the target is a large vehicle (step S42).

When determined that the type of the target is a large vehicle (YES at step S42), the ECU 40 determines whether or not the tilt angle θ of the vehicle body is greater than a predetermined second threshold Th2 (step S43).

When determined that the tilt angle θ is greater than the predetermined second threshold Th2 (YES at step S43), the ECU 40 determines whether or not the own vehicle speed V is greater than a predetermined third threshold Th3 (step S44).

When determined that the own vehicle speed V is greater than the predetermined third threshold Th3 (YES at step S44), the ECU 40 determines whether or not the curvature radius of the traffic lane in which the target is positioned is less than a predetermined curvature radius and the target is positioned on a curve (step S45).

When determined that the target is positioned on a curve (YES at step S45), the ECU 40 sets the side-surface retrieval area A2 for the side surface of the target (step S47).

Meanwhile, when determined that the rear-surface retrieval area A1 is not set (NO at step S41) or when, the tilt angle θ of the vehicle body is equal to or less than the predetermined second threshold Th2 regardless of the type of the target being a large vehicle (NO at step S43), the ECU 40 does not set the side-surface retrieval area A2. In a similar manner, when the own vehicle speed V is equal to or less than the predetermined third threshold Th3 (NO at step S44) or when the target position T is not positioned on a curve (NO at step S45), the ECU 40 does not set the side-surface retrieval area A2.

Returning to the main routine in FIG. 7, the ECU 40 determines whether or not the radar target L that is included in the retrieval area A is present (step S24). In the present process, the ECU 40 determines that the radar target L that is included in the rear-surface retrieval area A1 is present when only the rear-surface retrieval area A1 is set. Meanwhile, when both the rear-surface retrieval area A1 and the side-surface retrieval area A2 are set, the ECU 40 determines whether or not the radar target L that is present in each retrieval area A is present.

When determined that the radar target L that is included in the retrieval area A is present (YES at step S24), the ECU 40 determines whether or not the radar target L is the first target L1 (step S25). In the present process, the ECU 40 recognizes the radar target L as the first target L1 when a single radar target L is included in the retrieval area A. Meanwhile, when a plurality of radar targets L are included in the retrieval area A, the ECU 40 recognizes one of the plurality of radar targets L as the first target L1. For example, as described above, the ECU 40 selects, as the first target L1, the radar target L of which the degree of coincidence regarding position with the image target G is the highest.

When determined that the radar target L is not the first target L1 (NO at step S25), the ECU 40 determines whether or not the positional relationship and the speed relationship of the other radar targets L included in the retrieval area A with the first target L1 meet predetermined conditions (step S26). When the radar target L that has the same conditions as the first target L1 is present (YES at step S26), the ECU 40 recognizes the radar target L as the second target L2 (step S27). The ECU 40 determines that the first target L1 and the second target L2 are the same object (step S28).

In the process in FIG. 7, when determined that the image target G is not acquired (step S21), or when the radar target L that is included in the retrieval area A is not present (NO at step S24), the ECU 40 ends the process. In addition, when a single radar target L is included in the retrieval area A and the radar target L that has the same conditions as the first target L1 is not present (NO at step S26), the ECU 40 ends the process.

Next, a calculation process for the target position T will be described with reference to FIG. 10. First, the ECU 40 acquires the radar target L (step S51). The ECU 40 then acquires the image target G (step S52). Next, the ECU 40 determines whether or not the acquired radar target L is either of the first target L1 and the second target L2 (step S53). When determined that the radar target L neither the first target L1 nor the second target L2, the ECU 40 ends the process.

Meanwhile, when determined that the radar target L is either of the first target L1 and the second target L2 (YES at step S53), the ECU 40 determines whether or not the radar target L is included in the rear-surface retrieval area A1 (step S54). When determined that the radar target L is included in the rear-surface retrieval area A1 (YES at step S54), the ECU 40 calculates the first position T1 and the second position T2 (step S55). In this case, regarding the lateral position of the target position T (either of the first position T1 and the second position T2), the lateral position of the target is recognized through combination of the information on the lateral positions of the image target G and the radar target L.

Meanwhile, when determined that the radar target L is not included in the rear-surface retrieval area A1 (NO at step S54), the ECU 40 determines whether or not the radar target L is included in the side-surface retrieval area A2 (step S56). When the radar target L is included in the side-surface retrieval area A2 (YES at step S56), the ECU 40 calculates the first position T1 or the second position T2 (step S57). In this case, the lateral position of the target position T (either of the first position T1 and the second position T2) is recognized using only the information on the image target G.

When determined that the radar target L is neither the first target L1 nor the second target L2 (NO at step S53), or when determined that the radar target L is included in neither the rear-surface retrieval area A1 nor the side-surface retrieval area A2 (NO at step S54 and NO at step S56), the ECU 40 does not calculate the target position T.

Next, an execution example of the above-described processes will be described with reference to FIG. 11 and FIG. 12.

In FIG. 11, at time t1, an other vehicle M2 and a two-wheeled vehicle M3 are driving ahead of an own vehicle M1 in the own lane. In addition, an other vehicle M4 that is not a large vehicle is driving in an adjacent traffic lane on the right side of the own lane. The image target G and the radar target L are recognized for each of the other vehicle M2, the two-wheeled vehicle M3, and the other vehicle M4.

In this case, the type of the target regarding the other vehicle M2 that is driving in the own lane is neither the two-wheeled vehicle nor the large vehicle. In addition, the vehicle width of the other vehicle M2 is greater than the predetermined first threshold Th1. Therefore, the rear-surface retrieval area A1 is set. Meanwhile, the rear-surface retrieval area A1 is not set for the two-wheeled vehicle M3 that is driving in the own lane.

In addition, because the other vehicle M4 that is driving in the adjacent lane is not a large vehicle, the rear-surface retrieval area A1 is not set for the other vehicle M4 as well. Therefore, in the example in FIG. 11, the same-object determination process is performed for the other vehicle M2. The same-object determination process is not performed for the two-wheeled vehicle M3 and the other vehicle M4.

Here, a specific example of the same-object determination process for the other vehicle M2 will be described. First, at time t1, the other vehicle M2 is recognized as a single radar target L. As a result of the radar target L being included in the rear-surface retrieval area A1, the radar target L is recognized as the first target L1. Then, as the target position T, the first position T1 is calculated using the first target L1 and the image target G. Meanwhile, radar targets L other than the first target L1 are not included in the rear-surface retrieval area A1. Therefore, the second target L2 is not recognized.

At time t2, the positional relationship between the own vehicle M1 and the other vehicle M2 in the vehicle-width direction changes. The other vehicle M2 is now recognized as a plurality of radar targets L. As a result of the radar targets L other than the first target L1 being included in the rear-surface retrieval area A1, when the radar target L is recognized as the second target L2, the first target L1 and the second target L2 are determined to be the same target. Then, as the target position T, the second position T2 is calculated based on the second target L2 and the image target G. That is, at time t2, a plurality of target positions T (the first position T1 and the second position T2) are recognized for the same target.

At time t3, the recognition state of the first target L2 gradually becomes unstable. The first position T1 can no longer be calculated as the target position T. Meanwhile, the second target L2 is stably recognized. Therefore, in this case, the other vehicle M2 can be continuously recognized as the target for which control is performed using the second position T2.

Figure 12:
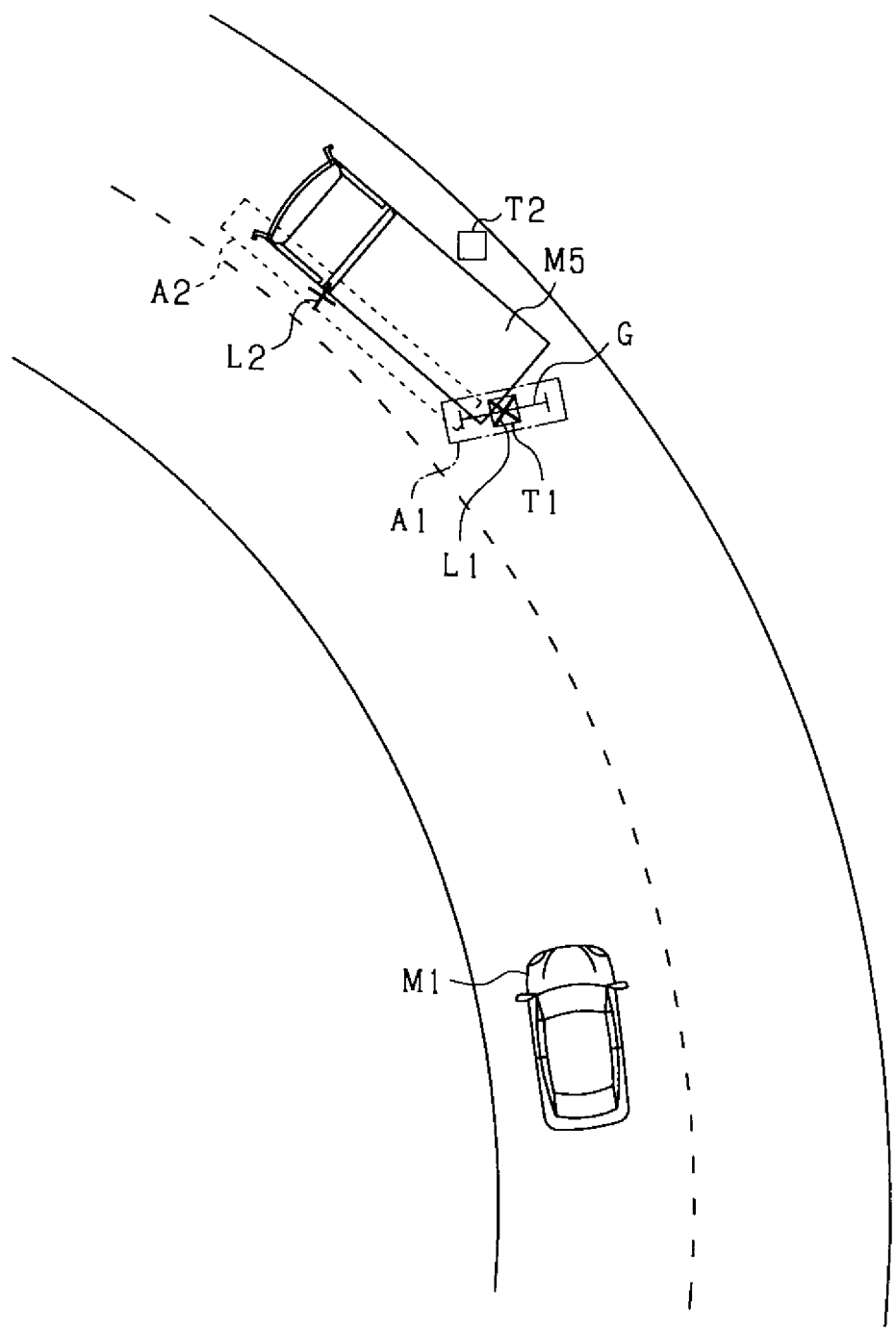
FIG. 12 is a diagram of an execution example of processes performed by the target recognition apparatus.

In FIG. 12, a large vehicle is driving as another vehicle M5 in the adjacent traffic lane on the right side of the own lane. The large vehicle is recognized as the image target G and a plurality of radar targets L. In this case, although the other vehicle M5 is driving in the adjacent lane, because the other vehicle M5 is a large vehicle, the rear-surface retrieval area A1 is set.

In addition, the tilt angle θ of the vehicle body of the other vehicle M5 is greater than the predetermined second threshold Th2 and the own vehicle speed V is greater than the predetermined threshold Th3. Furthermore, the other vehicle M5 is positioned on a curve. Therefore, the side-surface retrieval area A2 is set for the side surface of the vehicle body of the other vehicle M2.

In this case, the radar target L included in the rear-surface retrieval area A1 is recognized as the first target L. In addition, the radar target included in the side-surface retrieval area A2 is recognized as the second target L2. Furthermore, the first target L1 and the second target L2 are recognized as being the same object. The first position T1 is calculated as the target position T based on the first target L1 and the image target G. In addition, the second position T2 is calculated as the target position T based on the second target L2 and the image target G.

Here, the position in the vehicle-width direction of the first target L1 included in the rear-surface retrieval area A1 corresponds to the image target G and is included in an area in the vehicle-width direction of the other vehicle M5. Meanwhile, the position in the vehicle-width direction of the second target L2 included in the side-surface retrieval area A2 does not correspond to the image target G and is positioned outside of the area in the vehicle-width direction of the other vehicle M5.

Therefore, according to the present embodiment, the target position T (second position T2) that is calculated using the radar target L (second target L) included in the side-surface retrieval area A2 is calculated such that the position in the vehicle-length direction is identified by the radar target L and the position in the vehicle-width direction is identified by the image target G. As a result, even when the target position T is calculated using the radar target L that is included in the side-surface retrieval area A2, the position of the other vehicle M2 in the vehicle-width direction can be recognized as accurately as possible.

In the example in FIG. 12, the lateral position of the other vehicle M5 that is identified from the radar target L (second target L2) included in the side-surface retrieval area A2 is a position towards the own lane, outside of the area in the vehicle-width direction of the other vehicle M5. Meanwhile, the lateral position of the other vehicle M5 that is identified from the target position T (second position T2) is included within the actual area in the vehicle-width direction of the outer vehicle M5. In addition, in such cases, the occurrence of an erroneous recognition that the radar target L (second target L2) is in the own lane (advancing direction of the own vehicle) can be prevented.

As a result of the foregoing, the following excellent effects can be achieved.

The radar waves are affected by the surrounding environment and the like. As a result, the reception state of the radar waves tends to vary. When the reception state of the radar waves becomes unstable, the recognition state of the radar target L becomes unstable.

Here, the same object may be recognized as a plurality of radar targets L, depending on the effects of the positional relationship between the own vehicle and the target, the shape of the target, the surrounding environment, and the like. In this case, when the plurality of radar targets L is determined to be the same object, even when any of the radar targets L becomes unrecognizable, the same object can be continuously recognized using the other radar target L.

Therefore, any of the plurality of radar targets L included within a predetermined area relative to the image target G is recognized as the first target L. The radar target L other than the first target L1 is recognized as the second target L2. Upon such recognition, the first target L1 and the second target L2 are determined to be the same object.

As a result of the plurality of radar targets L included within the predetermined area relative to the image target G being recognized as the first target L1 and the second target L2, and the first target L1 and the second target L2 being determined to be the same object in the manner described above, even when any of the plurality of radar targets L recognized as the first target L1 and the second target L2 no longer is recognized, the same object can be continuously recognized using the other radar target L.

The target position T is calculated based on the first target L1 that serves as the radar target L and the image target G. When driving assistance control of the vehicle is performed based on the target position T, when the first target L1 and the second target L2 are recognized as being the same object, not only is the target position T (first position T1) calculated based on the first target L1 and the image target G, but the target position T (second position T2) is also calculated based on the second target L2 and the image target G.

Regarding the plurality of radar targets L (the first target L1 and the second target L2) that are determined to be the same object as described above, as a result of the plurality of target positions T being calculated based on each radar target L and the image target G, for example, even when the first target L1 no longer is recognized and the target position T (first position T1) no longer is calculated based on the first target L1 and the image target G, the driving assistance control of the vehicle can be continuously performed using the target position T (second position T1) calculated based on the other radar target L (second target L2) and the image target G.

The predetermined retrieval area A including the image target G is set in the captured image. As a result, the radar target L that is included in the retrieval area A can be recognized as the first target L1 or the second target L2.

When the type of the target is a vehicle, the rear surface of the vehicle body may be recognized as a plurality of radar targets L. Therefore, when the type of the target is a vehicle, the rear-surface retrieval area A1 including the rear surface of the vehicle body of the vehicle is set as the retrieval area A. Then, the radar target L included in the rear-surface retrieval area A is recognized as the first target L1 or the second target L2. As a result, the same-object determination regarding the plurality of radar targets L can be performed for the rear surface of the vehicle body.

Even when the type of the target is a vehicle, when the rear surface of the vehicle body is narrow in the vehicle-width direction, the likelihood of the rear surface of the vehicle body being recognized as a plurality of radar targets L is low. Therefore, the rear-surface retrieval area A1 is set if the rear surface of the vehicle body is equal to or greater than a predetermined size in the vehicle-width direction. As a result, the target recognizing unit 43 can exclude a target of which the rear surface of the vehicle body is not likely to be recognized as a plurality of radar targets L from the same-object determination.

When the type of the target is a large vehicle of which the size in the vehicle-length direction is equal to or greater than a predetermined size, depending on the positional relationship between the own vehicle and the large vehicle, the side surface of the vehicle body in addition to the rear surface may be recognized as the radar target L. Meanwhile, when the type of the target is not the large vehicle, the likelihood of the side surface of the vehicle body being recognized as the radar target L is low.

Here, when the target is not a large vehicle (that is, when the target is a small vehicle or the like), when setting of the side-surface retrieval area A2 is assumed, a plurality of differing targets (differing vehicles and the like) may be included in the side-surface retrieval area A2. As a result, differing targets may be erroneously recognized as being the same object.

Therefore, if the type of the target is a large vehicle, the side-surface retrieval area A2 that includes the side surface of the vehicle body of the large vehicle is set as the retrieval area A. The radar target included in the side-surface retrieval area A2 is then recognized as the first target L1 or the second target L2.

As a result of the foregoing, when the type of the target is a large vehicle, the same-object determination regarding the plurality of radar targets L can be performed for the side surface of the vehicle body. Meanwhile, when the type of the target is not a large vehicle, the side-surface retrieval area A2 is not set. Therefore, unnecessary calculation processes can be prevented from being performed in a state in which the side surface of the vehicle body is unlikely to be recognized as the radar target L. In addition, erroneous recognition of another target as the same object, being erroneously included in the side-surface retrieval area A2 can be prevented.

When a large vehicle is present ahead of the own vehicle in the advancing direction, the side surface of the vehicle body of the large vehicle is recognized as the radar target L in a state in which the vehicle body of the large vehicle is tilted relative to the own vehicle.

Meanwhile, when the vehicle body of the large vehicle is not positioned so as to be tilted relative to the own vehicle, when setting of the side-surface retrieval area A2 is assumed, a plurality of differing targets may be included in the side-surface retrieval area A2. Erroneous same-object determination may be performed.

Therefore, the side-surface retrieval area A2 is set if the tilt angle θ of the vehicle body of the large vehicle relative to the own body ahead of the own vehicle in the advancing direction is equal to or greater than a predetermined tilt angle. As a result, the occurrence of an erroneous same-object determination can be prevented in a state in which the side surface of the vehicle body is unlikely to be recognized as the radar target L.

The tilt angle θ of the vehicle body of the large vehicle relative to the own vehicle can be recognized through use of the movement history of the target.

In a state in which the own vehicle speed V is less than a predetermined vehicle speed and the own vehicle is driving at a low vehicle speed (such as while driving through a traffic jam), the inter-vehicle distance between the own vehicle and another vehicle (a preceding vehicle or a vehicle ahead of the preceding vehicle) driving ahead of the own vehicle is relatively short.

When the side-surface retrieval area A2 is set in such a state, a plurality of differing targets (the preceding vehicle and the vehicle ahead of the preceding vehicle) may be included in the side-surface retrieval area A2. The radar targets L recognized from another target may be erroneously recognized as being the same target.

Meanwhile, when the own vehicle speed V is equal to or greater than a predetermined vehicle speed, the inter-vehicle distance between the own vehicle and the other vehicle driving ahead of the own vehicle becomes relatively wide. Therefore, erroneous recognition such as the foregoing does not easily occur.

Therefore, the side-surface retrieval area A2 is set when the own vehicle speed V is equal to or greater than the predetermined vehicle speed. The side-surface retrieval area A2 is not set when the own vehicle speed V is less than the predetermined vehicle speed. As a result, the same object can be more appropriately recognized.

It is assumed that the side surface of the vehicle body is recognized as the radar target L in a state in which the curvature radius of the traffic lane in which the target (vehicle) is positioned is less than a predetermined curvature radius, that is, the target is positioned on a curve. Therefore, the side-surface retrieval area A2 is set if the curvature radius of the traffic lane in which the target is positioned is less than a predetermined curvature radius (that is, if the target is positioned on a curve).

As a result, unnecessary calculation processes can be prevented from being performed in a state in which the side surface of the vehicle body is unlikely to be recognized as the radar target L. In addition, erroneous recognition as the same object due to another target being erroneously included in the side-surface retrieval area A2 can be prevented.

It is assumed that a target (such as a preceding vehicle) that is positioned in the own lane becomes an obstacle for the own vehicle. Therefore, the retrieval area A (at least the rear-surface retrieval area A1) is set if the target is positioned in the own lane. As a result, calculation load resulting from the same-object determination being performed on a target that is unlikely to be an obstacle for the own vehicle can be reduced.

When the type of the target driving ahead of the own vehicle is a two-wheeled vehicle, it is assumed that the two-wheeled vehicle is unlikely to be simultaneously recognized as a plurality of radar targets L because the two-wheeled vehicle has a narrow vehicle width. In addition, the two-wheeled vehicle may drive alongside a preceding vehicle (four-wheeled vehicle) in a position near the preceding vehicle.

In such cases, unless the two-wheeled vehicle is recognized by both the radar target L and the image target G, the two-wheeled vehicle may be erroneously associated with the image target G corresponding to the preceding vehicle and be erroneously recognized as the same object.

Therefore, when the type of the target is the two-wheeled vehicle, the retrieval area A is not set for the target. As a result, the two-wheeled vehicle can be excluded from same-object recognition.

The radar targets L that are included in a predetermined area relative to an image target G other than the image target G used to calculate the target position T (first position T1) may not be the same object. Therefore, these radar targets L are excluded from recognition of the second target L2. Through use of the positional relationship with the plurality of image targets G, as described above, recognition accuracy regarding the second target L2 can be improved.

Among the radar targets L included in the predetermined area relative to the image target G, the radar targets L of which the distance therebetween is within a predetermined range and the difference in speed therebetween is less than a predetermined amount are recognized as the first target L1 and the second target L2. Through use of the positional relationship and the speed relationship between the radar targets in this manner, recognition accuracy regarding the second target L2 can be improved.

Even when the radar target L is included in the predetermined area relative to the image target G, the radar target L of which the positional relationship and the speed relationship with the first target L1 do not match is excluded from the recognition of the second target L2. Therefore, the effect of preventing erroneous recognition of a differing target as the same object can be improved.

The first target L1 or the second target L2 can be recognized taking into consideration various conditions such as the distance from the image target G, the reception strength of the radar waves, and the reception stability of the radar waves.

The present disclosure is not limited to the description according to the above-described embodiment. The present disclosure may also be carried out in the following manner. In the description below, configurations that are similar to those described above are given the same reference numbers. Detailed descriptions thereof are omitted.

In the description above, when a target position T that is selected as the preceding vehicle is present among the target positions T, the target recognizing unit 43 may set the rear-surface retrieval area A1 with reference to the target position T that is selected as the preceding vehicle. For example, in FIG. 4, when the radar target L on the right end is selected as the preceding vehicle, an area of which the distance to the radar target L on the right end is within a predetermined range and is included in the image target G may be set as the rear-surface retrieval area A1.

In the description above, when a plurality of radar targets L associated with the same image target G are present, the sameness determining unit 44 performs the same-object determination. In addition to the foregoing, the sameness determining unit 44 may perform the same-object determination when a plurality of radar targets L are present, regardless of whether or not the radar targets L are associated with the same image target G.

For example, the image target G may become difficult to acquire depending on the driving environment of the vehicle, such as when the vehicle is driving at night. However, even when the image target G is not acquired, a plurality of radar targets L may be acquired from a single target.

Therefore, in cases in which a plurality of radar targets L are present in positions that are near each other and indicate similar behavior, the plurality of radar targets L may be determined to be the same object, regardless of whether or not the plurality of radar targets L are associated with the same image target G. This process may be limited to a predetermined driving environment (driving at night). As a result of this process being performed, a plurality of radar targets L can be associated and recognized as being the same object even in cases in which the recognition state of the image target G is unstable.

In FIG. 7, described above, the process at step S26 may be omitted. That is, when the radar target L other than the first target L1 is present and the radar target L is included in the retrieval area A (either of the rear-surface retrieval area A1 and the side-surface retrieval area A2), the radar target L may be recognized as the second target L2.

In FIG. 8, described above, at least one of the processes at steps S31 to S33 may be omitted. As a result, the rear-surface retrieval area A1 may be set regardless of the type and size of the target.

In FIG. 8, described above, the process at step S34 may be omitted. That is, the rear-surface retrieval area A1 may be set regardless of whether or not the target is in the own lane when the type of the target is not a large vehicle.

In FIG. 7 to FIG. 9, described above, when the rear-surface retrieval area A1 is set (step S35), the side-surface retrieval area A2 may also be simultaneously set (step S46).

In FIG. 9, described above, the process at step S42 may be omitted. The side-surface retrieval area A2 may be set regardless of the type of the vehicle. That is, the side-surface retrieval area A2 may be set for the side surface of a vehicle other than the large vehicle.

In FIG. 9, described above, the process at step S43 may be omitted. The side-surface retrieval area A2 may be set regardless of the tilt angle θ of the vehicle body.

In FIG. 9, described above, the process at step S44 may be omitted. The side-surface retrieval area A2 may be set regardless of the own vehicle speed V.

In FIG. 9, described above, the process at step S45 may be omitted. The side-surface retrieval area A2 may be set regardless of whether or not the target is positioned on a curve.

When a large vehicle is driving ahead of the own vehicle, in cases in which the large vehicle changes directions such as by making a left or right turn, a state in which the rear surface of the large vehicle is recognized as the image target G transitions to a state in which the rear surface is not recognized as the image target G. In this case, the rear-surface retrieval area A1 is no longer set. However, the side-surface retrieval area A2 is preferably continuously set for the target (large vehicle).

Therefore, in FIG. 9, as a result of the process at step S41 being omitted, the side-surface retrieval area A2 may be set as the retrieval area A regardless of whether or not the rear-surface retrieval area A1 is set. For example, only the side-surface retrieval area A2 may be set if the image target G has been recognized in the past.

An example in which both a target that is at a far distance from the own vehicle and a target that is at a near distance from the own vehicle are detected by the single radar apparatus 20 is described above. In addition to the foregoing, as the radar apparatus 20, a far-distance radar apparatus 20 that detects a target that is at a far distance from the own vehicle and a near-distance radar apparatus 20 that detects a target that is at a near distance from the own vehicle may each be provided. When a plurality of radar apparatuses 20 are selectively used based on far distance and near distance, the above-described determination conditions regarding the radar target L may be set for each radar apparatus 20.

What is claimed is:

1. A target recognition apparatus that recognizes a target in a periphery of an own vehicle, the target recognition apparatus comprising:
   a radar target acquiring unit that acquires, using a processor, as a radar target, the target that is detected by transmission and reception of radar waves;
   an image target acquiring unit that acquires, using the processor, as an image target, the target that is included in a captured image captured by an imaging apparatus;
   a target recognizing unit that recognizes, using the processor, as a first radar target, one of a plurality of radar targets included in a predetermined area relative to a first image target and recognizes, as a second radar target, at least one of the plurality of radar targets other than the first radar target;
   a sameness determining unit that determines, using the processor, whether the first radar target and the second radar target are a same object;
   a first calculating unit that calculates, using the processor, as a first position, a target position of the target based on the first radar target as the radar target and the first image target as the image target; and
   a second calculating unit that calculates, using the processor, as a second position, the target position of the target based on the second radar target and the first image target in addition to the first position calculated by the first calculating unit, for a state in which the first radar target and the second radar target are determined to be the same object.

2. The target recognition apparatus according to claim 1, wherein:
   the target recognition apparatus is applied to a control system that performs driving assistance control of a vehicle based on a target position calculated based on the radar target and the image target.

3. The target recognition apparatus according to claim 2, further comprising:
   a setting unit that sets, using the processor, a retrieval area, which is predetermined, including the image target in the captured image, wherein:
   the target recognizing unit recognizes, as the first radar target and the second radar target, radar targets included in the retrieval area.

4. The target recognition apparatus according to claim 3, wherein:
   the setting unit sets a rear-surface retrieval area that includes a rear surface of a vehicle body of a vehicle as the retrieval area, when a type of the target is a vehicle; and
   the target recognizing unit recognizes radar targets included in the rear-surface retrieval area as the first radar target and the second radar target.

5. The target recognition apparatus according to claim 4, wherein:
   the setting unit sets the rear-surface retrieval area if the type of the target is a vehicle and the rear surface of the vehicle body of the vehicle is equal to or greater than a predetermined size in a vehicle-width direction.

6. The target recognition apparatus according to claim 3, wherein:
   the target recognizing unit does not recognize, as the second radar target, a radar target that is included in a predetermined area relative to an image target that differs from the image target used to calculate the first position.

7. The target recognition apparatus according to claim 1, wherein:
   the target recognizing unit recognizes, as the first radar target and the second radar target, radar targets of which a distance therebetween is within a predetermined range and a difference in speed therebetween is less than a predetermined amount, among the plurality of radar targets included in the predetermined range relative to the image target.

8. The target recognition apparatus according to claim 1, wherein:
the target recognizing unit does not recognize, as the second radar target, the radar target of which a distance from the first radar target is outside of a predetermined range and a difference in speed with the first radar target is equal to or greater than a predetermined amount, among the plurality of radar targets.

9. The target recognition apparatus according to claim 1, wherein:
the target recognizing unit recognizes the first radar target and the second radar target among the plurality of radar targets within the predetermined area, based on at least a distance from the image target, a reception strength of the radar waves, and reception stability of the radar waves.

10. A target recognition apparatus that recognizes a target in a periphery of an own vehicle, the target recognition apparatus comprising:
a radar target acquiring unit that acquires, using a processor, as a radar target, the target that is detected by transmission and reception of radar waves;
an image target acquiring unit that acquires, using the processor, as an image target, the target that is included in a captured image captured by an imaging apparatus;
a target recognizing unit that recognizes, using the processor, as a first radar target, one of a plurality of radar targets included in a predetermined area relative to the image target and recognizes, as a second radar target, at least one of the plurality of radar targets other than the first radar target;
a sameness determining unit that determines, using the processor, whether the first radar target and the second radar target are the same object; and
a setting unit that sets, using the processor, a side-surface retrieval area that includes a side surface of a vehicle body of a large vehicle as a retrieval area if a type of the target is a large vehicle that is equal to or greater than a predetermined size in a vehicle-length direction, wherein
the target recognizing unit recognizes radar targets included in the side-surface retrieval area as the first radar target and the second radar target.

11. The target recognition apparatus according to claim 10, wherein:
the setting unit sets the side-surface retrieval area if a tilt angle of the vehicle body of the large vehicle relative to the own vehicle ahead of the own vehicle in an advancing direction of the own vehicle is equal to or greater than a predetermined tilt angle.

12. The target recognition apparatus according to claim 11, wherein:
the setting unit sets the side-surface retrieval area if the tilt angle of the vehicle body of the large vehicle relative to the own vehicle determined based on a movement history of the target is equal to or greater than a predetermined tilt angle.

13. The target recognition apparatus according to claim 10, wherein:
the setting unit sets the side-surface retrieval area if an own vehicle speed is equal to or greater than a predetermined vehicle speed.

14. The target recognition apparatus according to claim 10, wherein:
the setting unit sets the side-surface retrieval area if a curvature radius of a traffic lane in which the target is positioned is less than a predetermined curvature radius.

15. The target recognition apparatus according to claim 10, further comprising:
an own lane recognizing unit that recognizes an own lane in which the own vehicle is driving, wherein:
the setting unit sets the retrieval area if the target is in the own lane.

16. A target recognition apparatus that recognizes a target in a periphery of an own vehicle, the target recognition apparatus comprising:
a radar target acquiring unit that acquires, using a processor, as a radar target, the target that is detected by transmission and reception of radar waves;
an image target acquiring unit that acquires, using the processor, as an image target, the target that is included in a captured image captured by an imaging apparatus;
a target recognizing unit that recognizes, using the processor, as a first radar target, one of a plurality of radar targets included in a predetermined area relative to the image target and recognizes, as a second radar target, at least one of the plurality of radar targets other than the first radar target; and
a sameness determining unit that determines, using the processor, whether the first radar target and the second radar target are a same object wherein:
the predetermined area is not set when a type of the target is a two-wheeled vehicle.

17. A vehicle control system comprising:
a vehicle controller that controls an own vehicle based on a recognition result of a target by a target recognition apparatus that recognizes the target in a periphery of the own vehicle, the target recognition apparatus comprising:
a radar target acquiring unit that acquires, using a processor, as a radar target, the target that is detected by transmission and reception of radar waves;
an image target acquiring unit that acquires, using the processor, as an image target, the target that is included in a captured image captured by an imaging apparatus;
a target recognizing unit that recognizes, using the processor, as a first radar target, one of a plurality of radar targets included in a predetermined area relative to a first image target and recognizes, as a second radar target, at least one of the plurality of radar targets other than the first radar target;
a sameness determining unit that determines, using the processor, whether the first radar target and the second radar target are a same object;
a first calculating unit that calculates, using the processor, as a first position, a target position of the target based on the first radar target as the radar target and the first image target as the image target; and
a second calculating unit that calculates, using the processor, as a second position, the target position of the target based on the second radar target and the first image target in addition to the first position calculated by the first calculating unit, for a state in which the first radar target and the second radar target are determined to be the same object.

18. A target recognition method for recognizing a target in a periphery of an own vehicle, the target recognition method comprising:
acquiring, as a radar target, the target detected by transmission and reception of radar waves;

acquiring, as an image target, the target included in a captured image captured by an imaging apparatus;

recognizing, as a first radar target, one of a plurality of radar targets included in a predetermined area relative to a first image target and recognizing, as a second radar target, at least one of the plurality of radar targets other than the first radar target;

determining whether the first radar target and the second radar target are a same object;

calculating, as a first position, a target position of the target based on the first radar target as the radar target and the first target as the image target; and calculating, as a second position, the target position of the target based on the second radar target and the first image target in addition to the first position calculated by the first calculating unit, for a state in which the first radar target and the second radar target are determined to be the same object.

\* \* \* \* \*